Dec. 19, 1950  J. LICHTMAN  2,534,371
HYDRAULIC BRAKE CHECK VALVE
Filed Oct. 25, 1948

INVENTOR.
Joseph Lichtman
BY Henry J. E. Metzler
Ag't

Patented Dec. 19, 1950

2,534,871

UNITED STATES PATENT OFFICE 2,534,871

HYDRAULIC BRAKE CHECK VALVE

Joseph Lichtman, Bronx, N. Y.

Application October 25, 1948, Serial No. 56,421

2 Claims. (Cl. 137—69)

This invention relates to certain new and useful improvements in brake control mechanism as applied to fluid actuated brakes on wheeled vehicles.

At present, the conventional hydraulic braking system is so constructed that in case of one brake becoming inoperative because of a leak in the pipe leading to it from the master cylinder, or in the brake cylinder itself, the entire system will become inoperative, as the braking fluid will waste through the aforesaid leak, and no pressure will be applied to the remaining brakes.

As is well known, when the foot brake pedal is depressed it pushes the piston in the master cylinder forward forcing fluid into a junction block or a T-socket. Front wheel brakes are coupled as are the rear, and each is fed by one line from this T-socket. As it requires very little fluid to expand all the brake shoes, it can readily be seen that a slight leak, anywhere in these lines or brake wheel assemblies, will allow the foot brake pedal to hit the floor and not stop the car. If air, which can be compressed, is present in the system it will cause the same effect.

One subject of the present invention is the provision of a device of the character described which is adapted for being used in place of the above mentioned T-socket and which will automatically close either of the lines, if a leak or air is present. The car may then be driven home on the remaining line with two wheel brakes.

Due to the fact that in most motor vehicles the brake pistons in the front brake assemblies are larger than those in the rear, they require less pressure to operate them. Therefore, the front wheel brakes go on first, and only when the pressure in them rises to a value necessary to overcome the higher resistance in the rear, are all four brakes applied. This setup is the cause of unpleasant and dangerous conditions. Proof of this is the fact that the front brakes wear out before the rear, a tremendous strain is put on the delicate front wheel alignment and suspension, plus an unpleasant dip in the front of the car.

Therefore another important object of the present invention is the provision of a device of the character described which will compensate the oil pressures between the front and rear brakes, thus cars may be stopped quicker, as all four brakes work at the same time, and which will eliminate the terrific shock to the front of the car when the brake pedal is stamped on and will transfer it to the rear which can take it better. In this way, it will save wear and tear on a delicate front end assembly and almost eliminate the dip when the brakes are applied.

A further object of the present invention is the provision of a device of the character described which is of a small size, so that it can be dimensioned in such a manner that it can be installed easily, simply and quickly into any vehicle after removal of the ordinary T-socket, and which is simple in construction, so that it can be manufactured and sold at a very reasonable price, but which is also reliable in operation, durable, sturdy, and well adapted to withstand the rough usage to which devices of this type are ordinarily subjected.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings.

Similar reference characters refer to similar parts throughout the several views.

Figure 1:
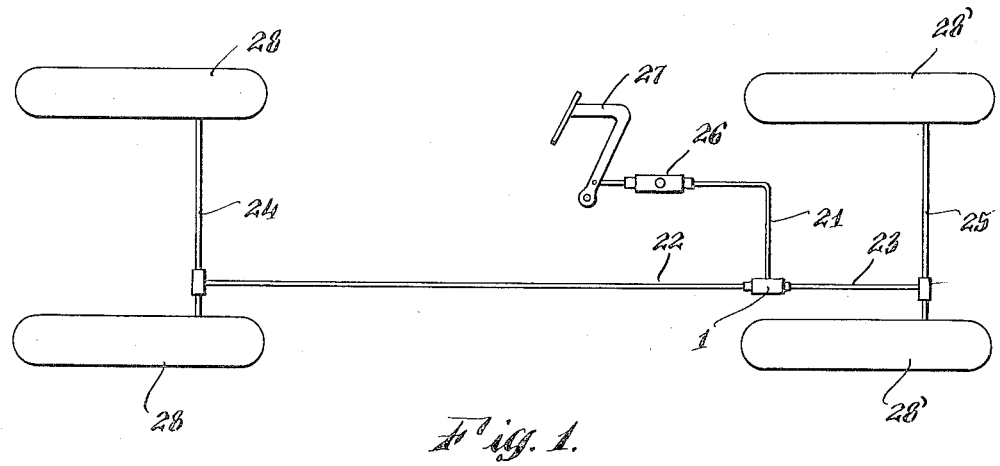
Figure 1 is a diagram of a braking system which incorporates my invention.
Figure 2:
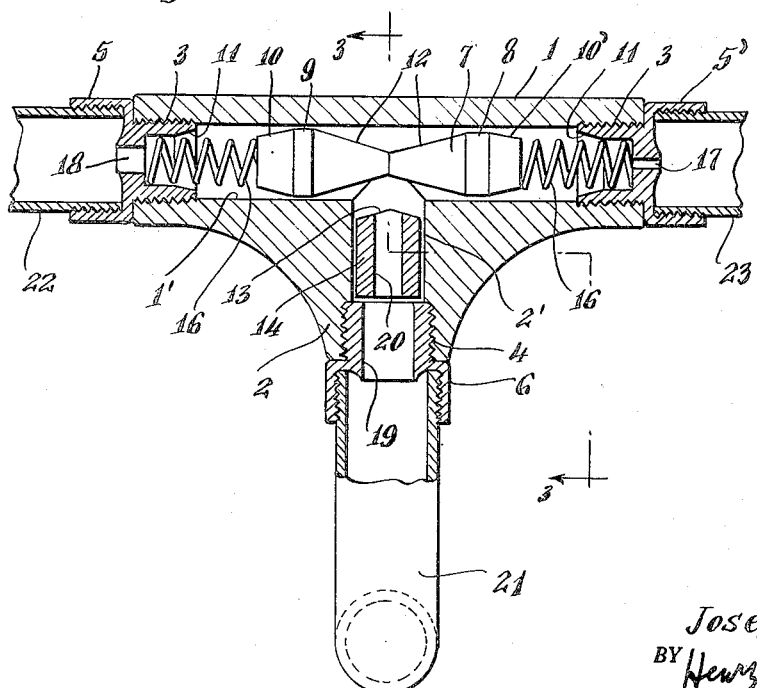
Figure 2 shows in horizontal section the interior of a preferred embodiment of my invention.
Figure 3:
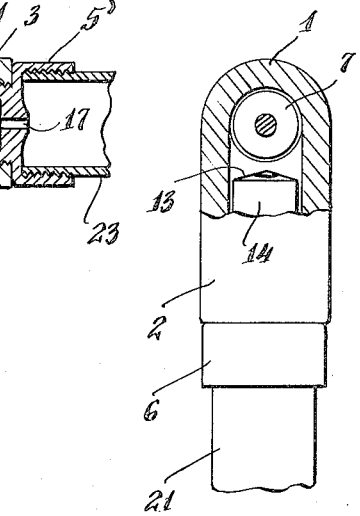
Fig. 3 is a fractional sectional view on the line 3—3 of Fig. 2.

In the drawing the numeral 1 denotes a hydraulic T-connection or a T-socket having a horizontal bore 1' in its horizontal portion and a vertical bore 2' in its vertical portion 2. The bores 1' and 2' preferably have a smooth inner surface for allowing the sliding of small pistons therein. The portion 2 has at its lower end an internal thread 4 engaged by a connecting member 6 and the horizontal portion of the T-socket 1 is provided at both extremities with internal threads 3 which are engaged by end fittings 5 and 5' respectively.

A two-headed piston 7, which has a notched center portion 12, an end portion 8 and an end portion 9 which is of a larger diameter than the end portion 8, and taper extremities 10 and 10', is horizontally slidable in the bore 1'. Those portions of the end fittings 5 and 5' which extend into the member 1 have at their ends conical bores 11 into which fit tightly the extremities 10 and 10' respectively of the piston 7 when the latter is forced against either one of said end fittings. In the bore 2' there is vertically slidable a piston 14 through which extends a vertical bore 20, that is preferably in alignment with the bore 19 in the member 6. The top 13 of the piston 14 is conical and is inclined in such a manner that it fits the inclination of the notched center portion 12 of the two-headed piston 7. Springs 16 are interposed between the piston extremities 10 and 10' and the end fittings 5 and 5'. The fitting 5 has a large outlet opening 18 and is connected by means of a pipe line 22 to a cross line 24 which terminates into the brake cylinders (not shown) of the rear wheels 28. The end fitting 5' is provided with a small outlet opening 17 and is connected by means of a pipe 23 to a cross-line 25 which terminates at the brake cylinders (not shown) of the front wheels 28'. The member 6 is connected by a pipe 21 to the master cylinder 26 which is actuated by the brake pedal 27. When the latter is depressed, fluid is pumped into the T-socket 1 and the piston 14 is lifted and its taper top 13 will be forced into the notch 12 of piston 7 thus steadying the latter, so that both end fittings 5 and 5' are open. Since there is more clearance between the piston portion 8 and the bore 1' than between the piston portion 9 and the bore 1', a larger volume of fluid can escape around the piston portion 8 than around the piston portion 9. Since the opening 17 is smaller than the opening 18, the flow of the fluid is restricted and its pressure is raised in the right-hand side of the bore 1', so that it equals the pressure in the left-hand side of bore 1', thus causing all brakes to work at the same time. This timing may be varied by enlarging or reducing the size of the outlet openings 17 and 18.

I have found that in operation the piston 7 remains fairly steady as the pressures at both ends are about equal. Should a break occur, or air enter either the lines or the wheel brake assemblies, the resulting loss of pressure in the affected side would cause the piston 7 to be driven into the end fitting closing this section. It will remain locked due to the tapered end portions of the piston 7 and the corresponding tapered portions 11. The car may then be driven on the unaffected side whether they are the front brakes or the rear, without any further loss of liquid. After repairs are made the piston 7 may be dislodged by a light tapping.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent in the United States is:

1. A hydraulic brake check valve comprising a T-socket whose horizontal ends have openings of different diameter, a two headed piston of different diameter at each head which piston is notched in the middle, slidable in the horizontal portion of said T-socket and resilient means holding said two-headed piston normally in the longitudinal center section of said horizontal portion, and a perforated piston having a conical head fitting into the notched middle portion of said two-headed piston vertically slidable in the vertical portion of said T-socket, said perforated piston to be raised by means of brake fluid passing said valve, the said heads of the two-headed piston being of smaller diameter than that of the corresponding borings of the horizontal portions of said T-socket, in order to provide passages of different cross section for the passage of fluid through the respective horizontal portions of the T-socket, said resilient means shifting the two-headed piston to the end of the horizontal portion of the T-socket where pressure loss occurs due to a break in the system and thereby closing said end.

2. The valve, as set forth in claim 1, in which the outer ends of the two-headed piston are tapered and the ends of the horizontal portion of said T-socket are of complementary taper, in order to retain the said piston in a line cutting position in case of a leak and to release said piston by means of a light tap on the T-socket.

JOSEPH LICHTMAN.

REFERENCES CITED

The following references are of record in the file of this patent:

UNITED STATES PATENTS

| Number | Name | Date |
|---|---|---|
| 1,588,657 | Christensen | June 15, 1926 |
| 1,664,680 | Hallett | Apr. 3, 1928 |
| 2,055,182 | Schultz | Sept. 22, 1936 |
| 2,136,706 | Ostrander | Nov. 15, 1938 |
| 2,145,790 | Groves | Jan. 31, 1939 |
| 2,189,224 | Roberts | Feb. 6, 1940 |
| 2,219,786 | Olley | Oct. 29, 1940 |
| 2,386,585 | Blank | Oct. 9, 1945 |

FOREIGN PATENTS

| Number | Country | Date |
|---|---|---|
| 349,520 | Great Britain | May 27, 1931 |